Figure 4:
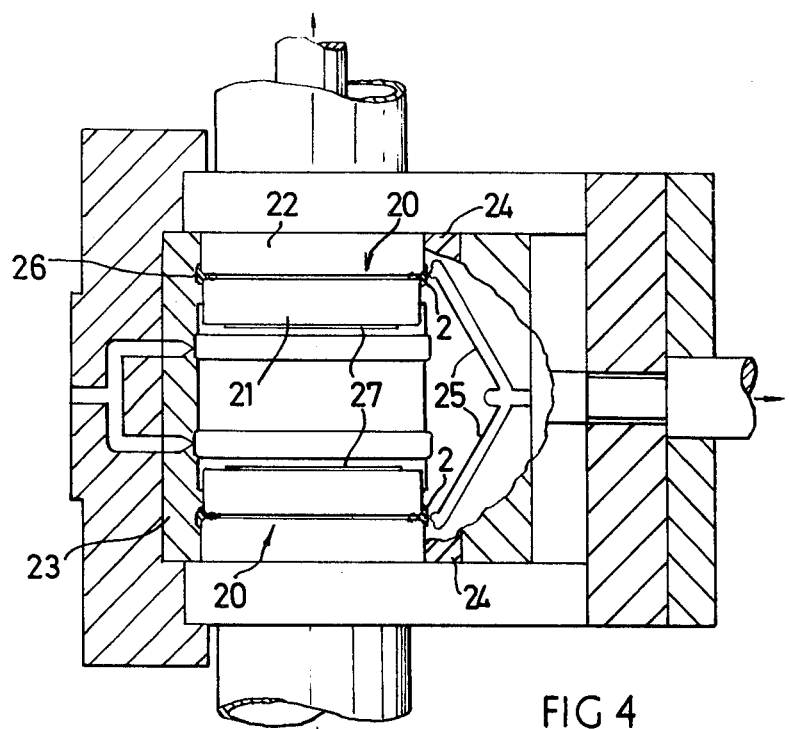

United States Patent [19]

Glover et al.

[11] 4,173,362

[45] Nov. 6, 1979

[54] FEMALE PIPE COUPLING MEMBER WITH ANNULAR SEAL RING

[75] Inventors: John B. Glover, Huddersfield; John Upton, Darfield near Barnsley, both of England

[73] Assignee: The Hepworth Iron Company Limited, Stocksbridge, England

[21] Appl. No.: 784,314

[22] Filed: Apr. 4, 1977

[30] Foreign Application Priority Data

Apr. 6, 1976 [GB] United Kingdom ............... 13936/76

[51] Int. Cl.² ..................... F16L 17/00; F16L 21/00
[52] U.S. Cl. .................... 285/110; 285/235;
285/345; 285/423; 277/207 A
[58] Field of Search ............. 285/369, 235, 236, 383,
285/423, 379, 110, 230, 231, 345; 277/207 A

[56] References Cited

U.S. PATENT DOCUMENTS

| | | | |
|---|---|---|---|
| 3,198,559 | 8/1965 | Snyder | 285/383 X |
| 3,368,830 | 2/1968 | French | 285/235 X |
| 3,493,236 | 2/1970 | Kleindienst | 285/379 X |
| 3,563,574 | 2/1971 | Jackson et al. | 285/235 X |
| 3,744,806 | 7/1973 | Keyser | 285/230 X |
| 3,924,881 | 12/1975 | O'Connor | 277/207 A X |
| 4,014,556 | 3/1977 | Anderson | 285/230 X |
| 4,070,044 | 1/1978 | Carrow | 285/369 X |
| 4,076,282 | 2/1978 | Scott, Jr. et al. | 285/423 X |
| 4,116,474 | 9/1978 | Wolf | 285/110 |
| 4,120,521 | 10/1978 | Parmann | 285/345 X |

FOREIGN PATENT DOCUMENTS 1236907 6/1971 United Kingdom ............... 285/369

OTHER PUBLICATIONS

Excerpt from "Aerospace Fluid Component Designers' Handbook", vol. II, Sections 12.3–1 through 12.3—2.13 (Feb.'70).

Primary Examiner—Mervin Stein
Assistant Examiner—Carl F. Pietruszka
Attorney, Agent, or Firm—Ladas, Parry, Von Gehr, Goldsmith & Deschamps

[57] ABSTRACT

A pipe coupling formed by a tubular plastic member having at one end a portion of increased diameter defining an inwardly facing annular recess, and an annular sealing ring bonded therein by a foot portion substantially filling the recess and having a sealing head portion projecting partway across the interior of the coupling and secured to such foot portion by a neck portion. The seal ring configuration lends itself to injection molding of the assembly.

6 Claims, 10 Drawing Figures

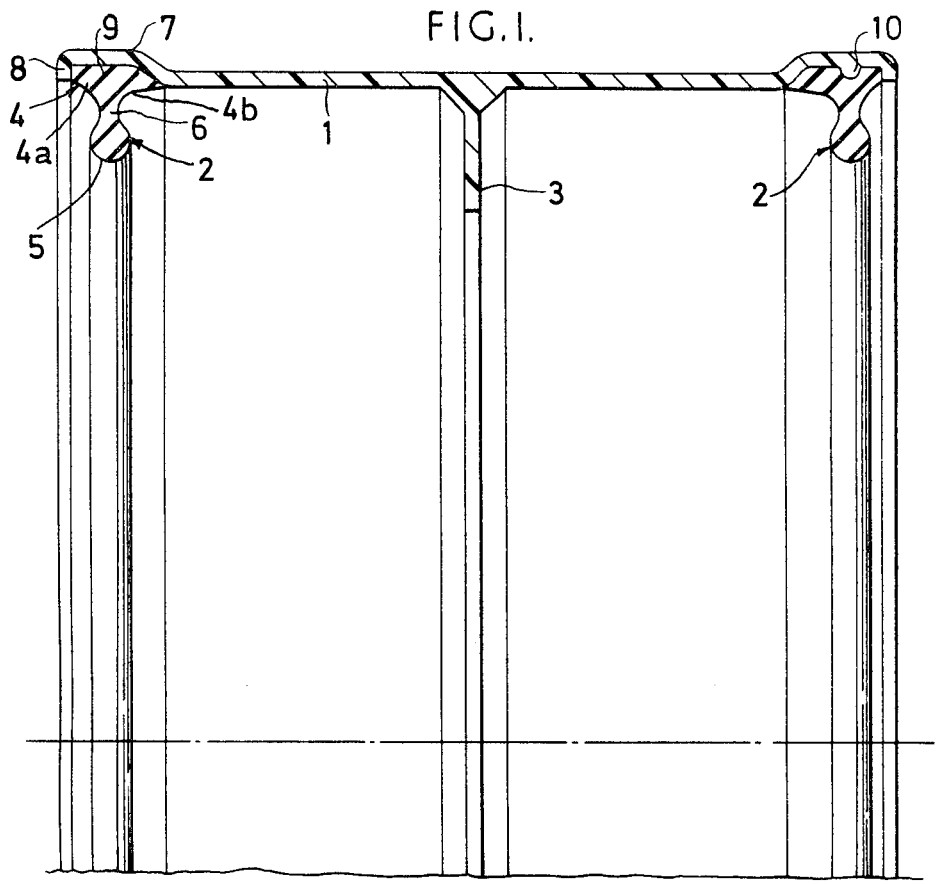
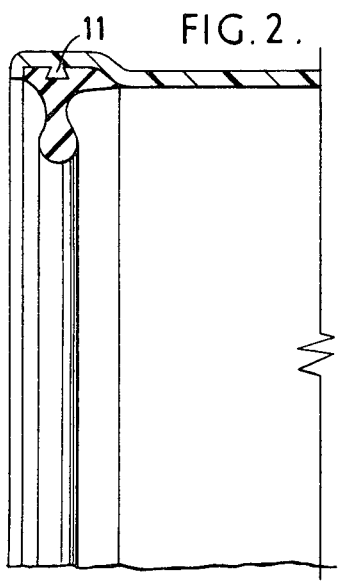
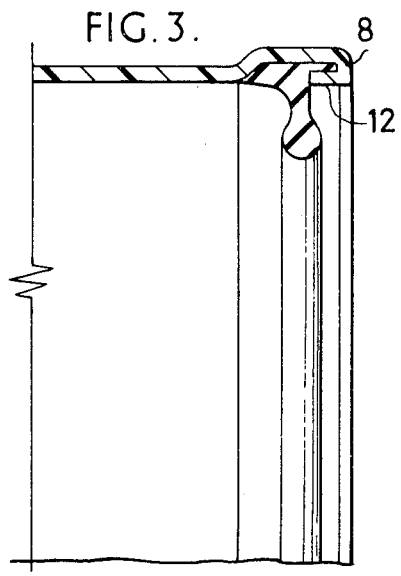

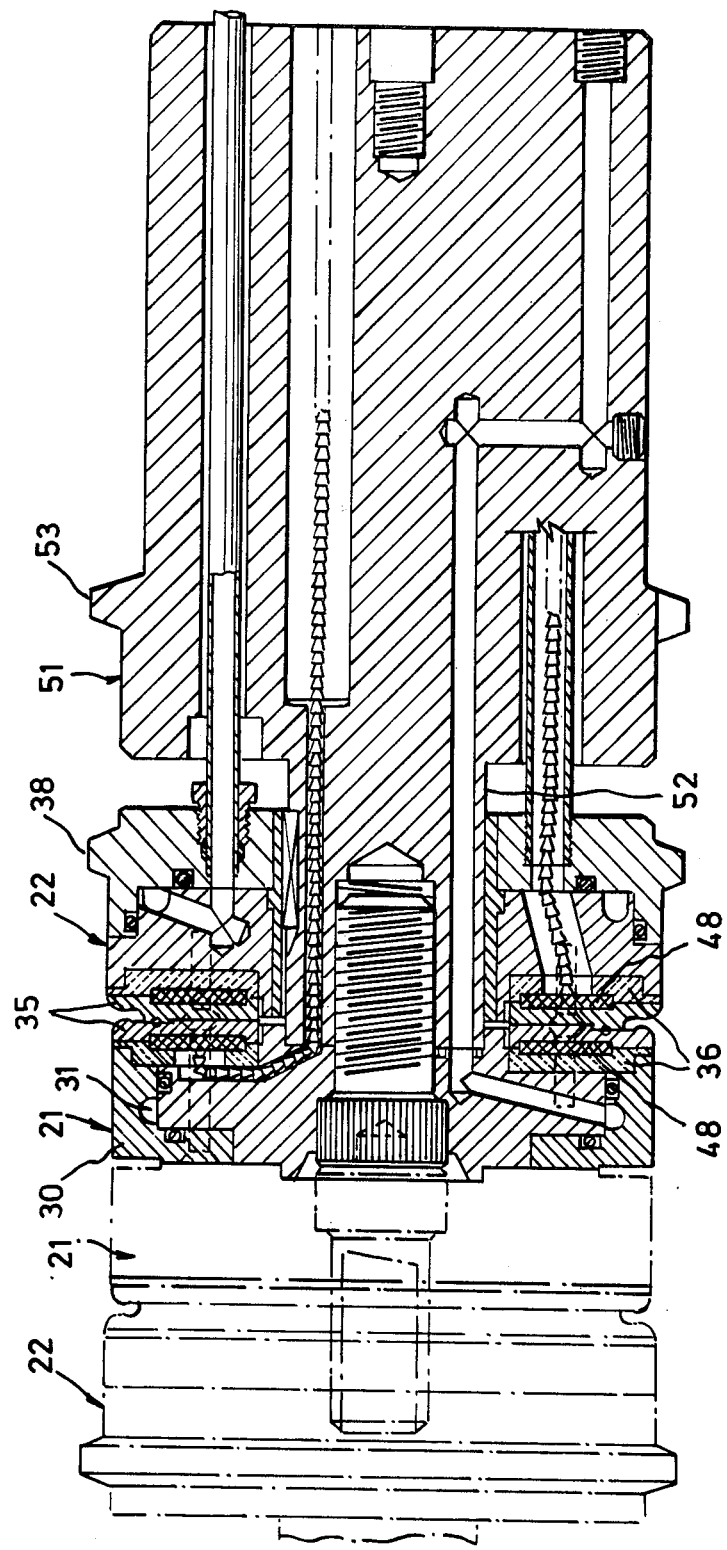

FEMALE PIPE COUPLING MEMBER WITH ANNULAR SEAL RING

This invention relates to the manufacture of plastics pipe couplings either of the sleeve type or of the socket and spigot type for plastics piping or piping of clayware, pitch-fibre, asbestos cement or concrete such as is used in sewers, drains, cable conduit or the like.

In our Copending British patent application No. 4372/75, we have described and claimed a method of manufacturing a plastics pipe coupling wherein a first annular member is injection moulded onto a preformed second annular member so that the first and second annular members unite with a mechanical, mechanical/-chemical or a chemical bond. The first and second annular members are moulded in successive steps in the same injection moulding apparatus provided with movable mould-defining members for defining respective moulding cavities corresponding to the first and second annular members of the coupling.

A disadvantage of the moulding method and apparatus disclosed in application No. 4372/75 is that it was necessary either to restrict the radial thickness of the sealing ring to permit retraction of the moulding core, or to make the core collapsible, since the plastics sleeve or pipe encircling the sealing ring naturally prevents the latter from being stretched to permit stripping from the core. This is because the usual presence in the coupling of a central internal flange, and of a second sealing ring at the other end of the coupling, make it necessary that the core used for forming one sealing ring be withdrawn in only one axial direction and consequently the core cannot be simply split in the median plane of the sealing ring and stripped by axial separation of the halves of the core.

According to the present invention, we provide a method of making an article comprising a substantially rigid annular member and a deformable annular member attached thereof and extending radially inwards, wherein a first said member is injection moulded into the other said member, the injection moulding cavity being defined internally by a core, and the article and the core are separated by relative movement in the axial direction of the article, the core and deformable annular member moving one past the other, the deformable annular member being deformed by the core in the course of the said relative movement.

It is to be understood that the method of the invention can be used in general when a resilient annular member and a more or less rigid supporting member are to be moulded one onto the other and where it is not convenient to provide a transversely split core of which the parts can be withdrawn in opposite directions away from the sealing member. Thus, in the case of a plastics pipe with a socket incorporating a sealing ring, the use of a split core of which the parts can be withdrawn in opposite directions is precluded by the length of the pipe and the fact that in general the pipe end incorporating the socket and sealing ring is of greater diameter than the rest of the pipe.

Accordingly, it will be understood that the scope of the invention is not limited to plastics pipes and pipe couplings, although this is the preferred field.

In the preferred practical embodiment of the present invention, the resilient member (sealing ring) is moulded first and the substantially rigid member (coupling sleeve or pipe socket) is moulded in direct contact with the resilient member. However, the order of moulding can be reversed, or one of the members can be pre-formed in a separate manufacturing step.

It is preferred to use compatible materials for the sealing and supporting members, so as to provide a direct bond between these by fusion, interpenetration, welding or chemical interaction at the interface, but it has been found that materials which are theoretically incompatible will form a bond which is adequate for most practical purposes; this is believed to be a kind of surface tension bond. Mechanical interlocking or keying between the members may be provided in addition or alternatively.

In a preferred embodiment of the invention, we provide a pipe socket or coupling comprising a tubular plastics member having at an end thereof a portion of increased diameter defining an inwardly facing annular recess, and a sealing ring secured in the recess by means of a foot portion substantially filling the recess and having a sealing head projecting partway across the interior of the coupling sleeve or socket and secured to the foot portion by a neck. To provide mechanical keying, the recess may contain one or more annular ribs and/or grooves, and/or circumferentially distributed transverse ribs and/or circumferentially distributed radial recesses or apertures.

The invention will be further described with reference to the accompanying drawings, in which:

FIGS. 1 to 3 show embodiments of a plastics pipe coupling embodying the invention.

Figure 8:
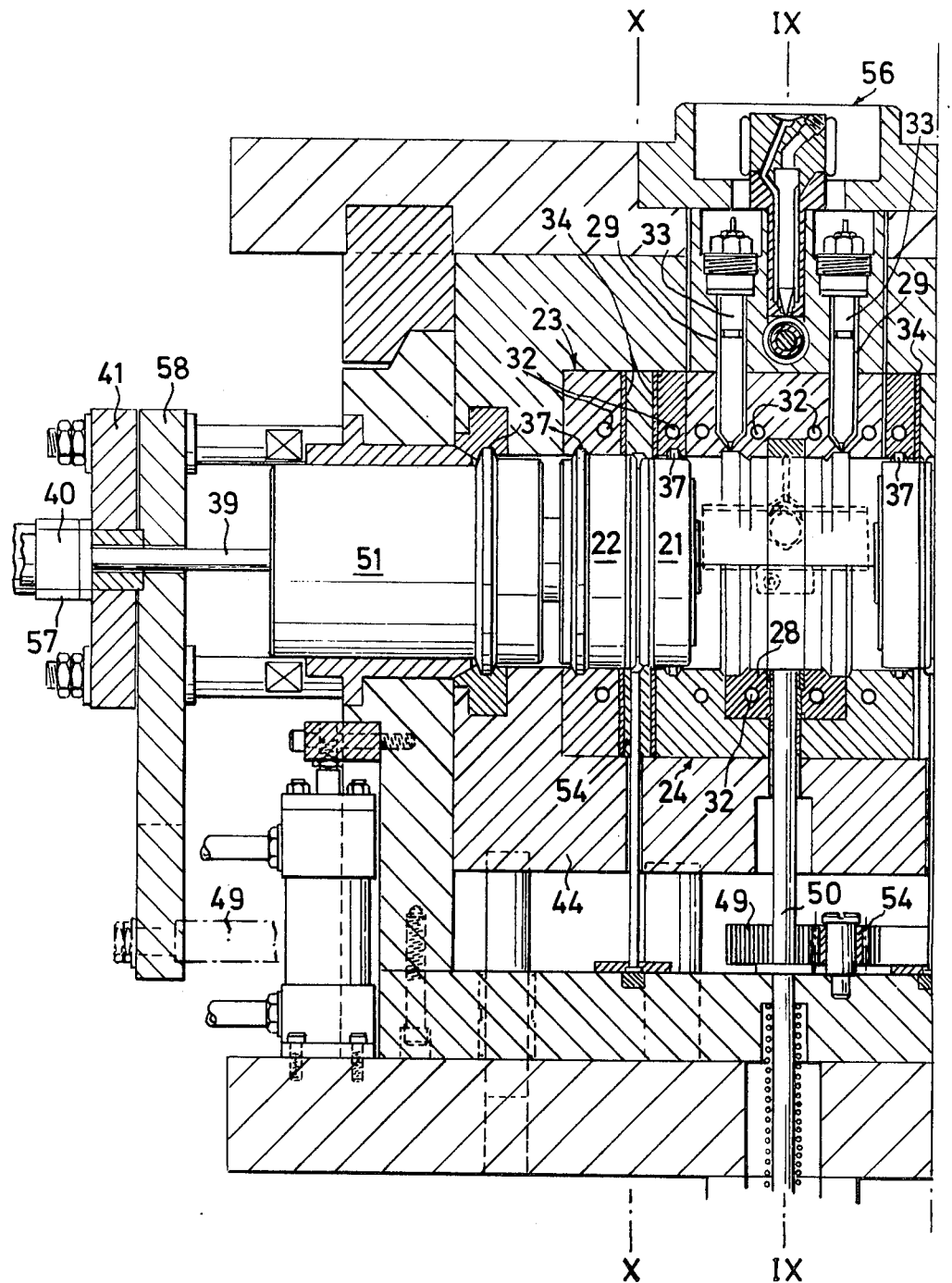
Figure 9:
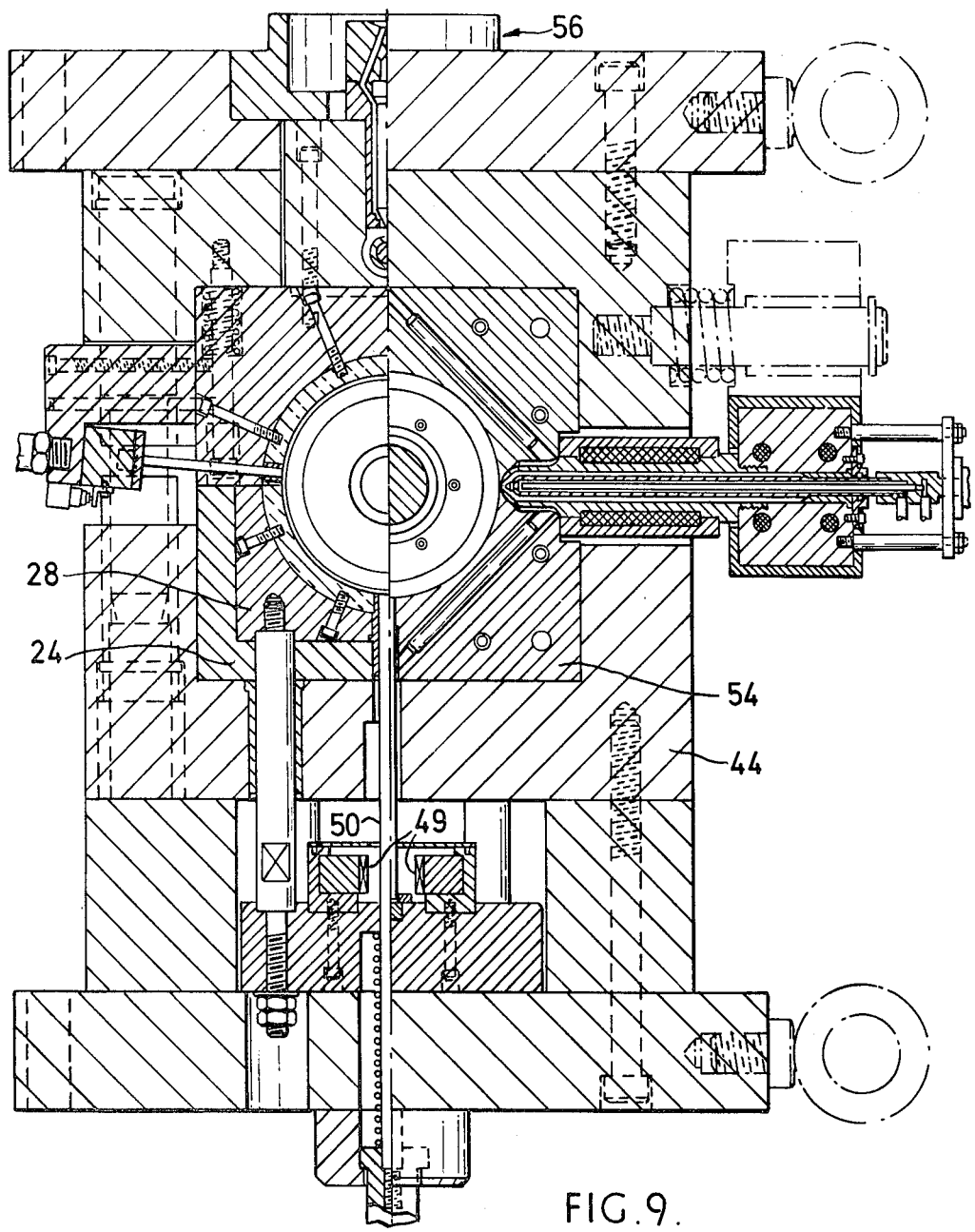

FIGS. 4 tp 7 show schematically apparatus used to produce the coupling of FIG. 1, at successive stages of the manufacturing process, and FIGS. 8 to 10 show detail of the moulding apparatus.

FIG. 1 shows a radial section through a plastics pipe coupling, which comprises an injection moulded plastics sleeve 1 with an elastomeric sealing ring 2 at each end. At an intermediate position, preferably substantially mid-way, the plastics sleeve has an internal flange 3 or a ring of internal projections, for locating the ends of pipes to be coupled together by being inserted into opposite ends of the coupling.

Each sealing ring has a foot portion 4 anchored to the internal surface of the sleeve, and a sealing head 5 which projects radially, and optional axially, into the sleeve and is connected to the foot portion by a neck 6 to facilitate flexing of the sealing ring when a pipe end is inserted into the coupling. The axially outer region 4a of the foot portion has an internal diameter not less than and preferably greater than that of the axially inner region 4b, and also not less than and preferably greater than that of the major part of the sleeve.

To accommodate the foot portion 4, the sleeve has at each end an enlarged region 7 and an end flange 8 defining an annular recess 9 which is filled by the foot portion. The internal diameter of the flange 8 is not less than and preferably greater than the internal diameter of the major part of the sleeve and this flange can in some circumstances be omitted entirely.

Preferably, the plastics sleeve and the elastomeric sealing ring are made of compatible materials so that a direct bond is formed at their interface. Thus, we prefer that both materials be thermoplastic. Thermoplastic materials and in particular thermoplastic elastomers do not always have satisfactory mechanical properties, especially resistance to compression set for use as pipe couplings, but this difficulty can be overcome by radiation treatment to induce cross linking in the material, e.g. as described in our copending British patent application No. 9960/76.

Mechanical keying or interlocking between the sleeve and the sealing ring can be provided if desired, e.g. as shown on the right hand side of FIG. 1 by an annular bead 10 on the sleeve in the recess. FIGS. 2 and 3 show alternative forms of key, namely a dove-tail-section rib 11 in FIG. 2 and an axial extension 12 of the flange 8, in FIG. 3.

The pipe coupling is manufactured by the method and apparatus shown in FIGS. 4 to 10.

The injection moulding apparatus shown is symmetrical and comprises two movable core assembies 20 each comprising an axially inner core member 21 and an axially outer core member 22. The core members operate in a mould chamber defined by opposed mould blocks 23, 24 which can be moved transversely towards and away from the peripheral surfaces of the core members. The core assemblies and mould blocks can be moved by hydraulic cylinders.

Initially (FIG. 4) the core assemblies are axially separated from each other and in each the core members 21, 22 abut and define a peripheral annular groove aligned with a respective injection passage 25 (of which several may be provided). The mould blocks 23, 24 are in their closed position, and annular grooves 26 therein register with the aforesaid grooves defined by the core members 21, 22 so as to define a pair of mould cavities of form corresponding to the sealing rings 2 of the coupling. Thermoplastic or other elastomer or rubber is then injected through an injection nozzle (not shown) to form the sealing rings.

Figure 5:
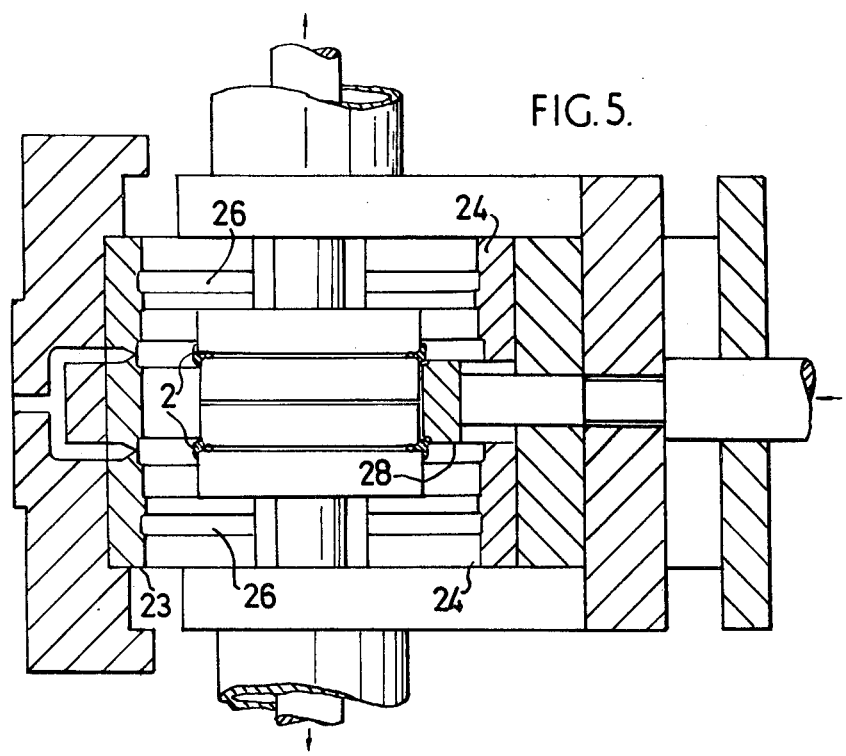
Figure 6:
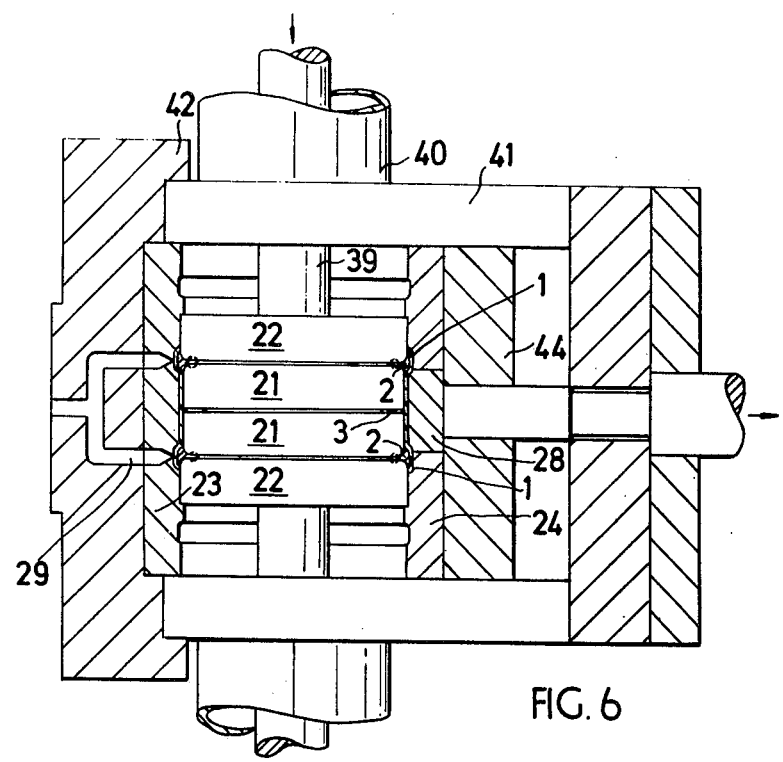

After injection of the rubber, the mould blocks are opened as shown in FIG. 5 and the core assembies are moved towards each other until lands 27 on their opposed faces abut as shown in FIG. 5. The core assemblies carry with them the moulded sealing rings. The mould blocks 23, 24 are then advanced, and, with a further mould block 28, the peripheries of the core members and the annular gap between the cores encircling the lands 27, and the previously moulded sealing rings, define an annular moulding cavity corresponding in shape to the plastics sleeve 1 of the coupling. This sleeve is then injection-moulded by injection of thermoplastic material through passages 29 from injection-moulding apparatus (not shown), as shown in FIG. 6. The material of the sleeve, e.g. polypropylene or polyethylene, is thereby bonded to the sealing rings.

Figure 7:
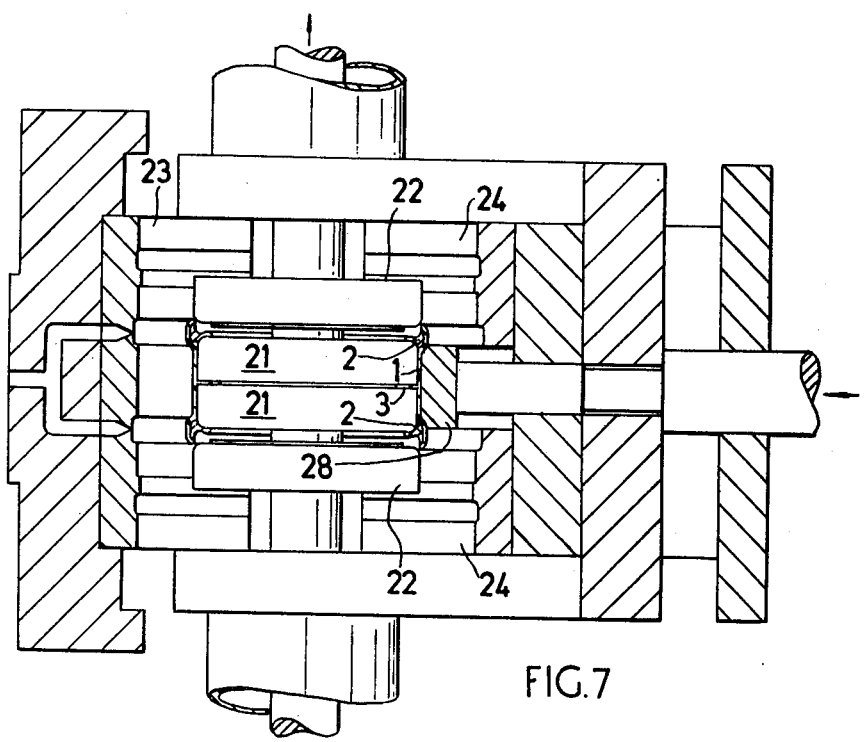

The mould blocks 23, 24 are then again opened as shown in FIG. 7 and the outer core members 22 are moved axially away from the inner core members 21 which remain stationary, as shown in FIG. 7. The moulded coupling is held in position by the intermediate mould block 28. After the outer core members 22 have moved away from the sealing rings, the inner core members 21 begin to move apart, this movement being permitted by deformation of the radially inner portions of the sealing rings into the clearance made available by the fact that the outer flange 8, and the adjacent region 4a of the foot of each sealing ring, are of greater diameter than the inner core members 21, as best seen in FIG. 6. When the core members 21 have been withdrawn to positions clear of the moulded coupling, the latter can be removed and the apparatus is then ready for production of another coupling.

The separation of the core members 21, 22 shown in FIG. 7 can be achieved for example by springs acting between each core member 21 and the associated core member 22, there being a limited amount of lost motion between the core member 21 and the associated core member 22, so that when the core member 22 is retracted the core member 21 initially remains pressed against the other core member 21, but begins to move with the associated core member 22 when the lost motion has been taken up.

FIGS. 8 to 10 show details of a preferred form of the apparatus, which is shown in FIG. 8 in the same position as in FIG. 4. FIG. 9 shows cross-sections on the lines IX—IX and X—X of FIG. 8, and FIG. 10 shows a core assembly in section.

The body of each core member is e.g. of stainless steel, as are the mould blocks. The region of the core member 21 contacted by the thermoplastics material during moulding of the sleeve comprises e.g. an aluminium alloy sleeve or ring 30 enclosing a cooling channel 31, and the mould blocks also contain cooling channels 32, so that the apparatus operates as a chilled mould when moulding the plastics sleeve of the coupling. The injection passages 29 for the plastics material are provided with electric heaters 33.

In contrast, the regions defining the moulding cavities for the sealing rings are heated and thermally insulated. The annular groove 26 is defined by a plate 54 between thermal insulation 34 and the corresponding regions of the core members 21,22 comprise face plates 35 provided with electric heating means 48 and with thermal insulation 36, for curing thermosetting elastomers by heat.

For ease of manufacture, the mould blocks in the apparatus shown in FIG. 8 are composed of a plurality of sections, instead of being single integral blocks as shown in FIG. 4. The sections comprising the mould blocks 23 and 24 are mounted in respective bolsters which can be separated for example by means of hydraulic cylinders, for opening the mould. The bolster 44 carrying the sections of the mould block 24 is traversed by a push rod 50 for ejecting the moulded article.

The core assemblies are coupled to respective plates 41 carrying hydraulic cylinders 40 each coupled to the associated core member 21 by a piston rod 39. Each plate 41 carries two further cylinders 57, one on each side of the central cylinder 40, coupled to an axially movable inner plate 58. Each plate 58 is coupled to the associated core member 22 and the two symmetrically disposed plates 58 are inter-coupled by toothed racks 49 and a pinion 54 to ensure synchronous movement. By means of the cylinders 40, 57, the core members 21, 22 can be moved in synchronism or the members 21, 22 can be moved relative to one another.

Each core member 21 is fastened with an axially slidable block 51 and the associated core member 22 is slidable on a neck 52 which connects the block 51 to the core member 21, as shown in FIG. 10. The block 51 has a locking flange 53 and the core member 22 has a corresponding locking flange 38. The block 51 can be moved axially by means of the associated piston rod 39. The locking flanges 38, 53 engage locking grooves 37 in the moulding apparatus, to locate the core members accurately in the correct positions during the different stages of the moulding operation illustrated in FIGS. 4 to 7.

FIG. 9 shows, on the right hand side, one of the injection nozzles 55 provided for injection of the elastomer to form the sealing rings. The injection inlet 56 for the plastics sleeve material is at the top of the apparatus.

It will be seen that we have provided a product, process and apparatus permitting core stripping by purely axial movement.

We claim:

1. A pipe joint member comprising a tubular injection-moulded plastics member having a main portion of a predetermined diameter and at one end thereof a portion of increased diameter defining an inwardly facing annular recess, and a resilient injection-moulded sealing ring in the recess, having a foot portion substantially filling and mould-bonded in the recess and having a sealing head projecting partway across the interior of the joint member and secured to the foot portion by a neck, the sealing head being deformable to an internal diameter at least equal to said predetermined diameter to permit passage of a core used for moulding said joint member.

2. A pipe joint member as claimed in claim 1 wherein the internal diameter of the foot portion, in the region thereof nearer the adjacent end of the tubular plastics member, is greater than the internal diameter of the region of the foot further from the said end.

3. A pipe joint member as claimed in claim 1, in which the sealing ring consists of a radiation-treated thermoplastic elastomer.

4. A pipe joint member as claimed in claim 1, in which the sealing ring is mechanically keyed to the tubular plastics member.

5. A pipe joint member as claimed in claim 1, in which the material of the sealing ring is a cross-linked thermoplastic elastomer.

6. A pipe joint member as claimed in claim 1, wherein said main portion of the tubular member has two ends and at the end opposite said one end has a second portion of increased diameter also defining an inwardly facing annular recess, and wherein the joint member further comprises a second resilient injection-moulded sealing ring in the recess defined by said second portion, said second sealing ring having a foot portion substantially filling and mould-bonded in the recess and having a sealing head projecting partway across the interior of the joint member and secured to the foot portion by a neck, the sealing head being deformable to an internal diameter at least equal to said predetermined diameter to permit passage of a core used for moulding said joint member.

* * * * *